Patented May 17, 1949

2,470,109

UNITED STATES PATENT OFFICE 2,470,109

HETEROCYCLIC AMINES

John T. Plati, Passaic, and Wilhelm Wenner, Montclair, N. J., assignors to Hoffmann-La Roche Inc., Nutley, N. J., a corporation of New Jersey No Drawing. Application April 30, 1947, Serial No. 745,110

22 Claims. (Cl. 260—290)

This application is a continuation-in-part of our application Serial No. 721,672, filed January 11, 1947, now Patent Number 2,470,108, May 17, 1949.

This invention relates to a new group of heterocyclic amines and to their method of production. Our new heterocyclic amines are more particularly characterized by the following general formula:

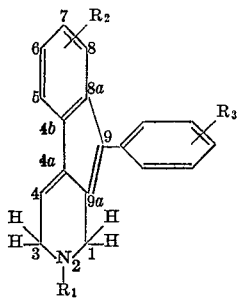 (I)

wherein $R_1$ is an alkyl group such as, for example, methyl, ethyl, propyl, isopropyl, butyl, isobutyl, tertiary-butyl, amyl and the like; $R_2$ and $R_3$ are hydrogen, an alkyl group, such as methyl, ethyl, propyl, isopropyl, butyl, isobutyl, t-butyl, amyl, and the like, or an alkoxy group as, for example, methoxy, ethoxy, propyloxy, and the like.

We have assigned the name "2-alkyl-9-phenyl-dihydro-1-pyridindenes" to the new class of compounds since they may be regarded as derivatives of the hypothetical basic ring system which can be represented by the following formula:

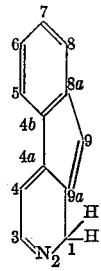 (A)

We have given the name "1-pyridindene" to this basic ring system A, indicating by this nomenclature its structure as derived from a combination of the ring systems pyridine and indene. It is to be understood that by the expression "2-alkyl-9-phenyl-dihydro-1-pyridindenes," as employed herein and in the claims we include the compounds wherein the phenyl ring and the pyridindene nucleus are unsubstituted or substituted.

Our invention also embraces the hydrogenated derivatives of the 2-alkyl-9-phenyl-dihydro-1-pyridindenes, such as, for example, the 2-alkyl-9-phenyltetrahydro-1-pyridindenes and the 2-alkyl-9-phenyl - hexahydro-1-pyridindenes. To the compounds of type I and their hydrogenated derivatives, we have assigned the generic name "2-alkyl - 9 - phenyl-hydro-1-pyridindenes," by which term as employed herein and in the claims we include the compounds wherein the phenyl ring and pyridindene nucleus are unsubstituted or substituted.

The new compounds of type I can readily be prepared by a short, smoothly-functioning synthesis from cheap starting materials.

In one embodiment of our invention we employ as a starting material a piperidine compound of the following formula:

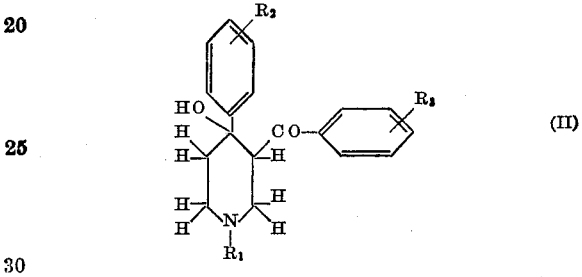 (II)

and treat it with a cyclizing and dehydrating agent to form the compound of type I. In formula II, $R_1$, $R_2$ and $R_3$ have the same significance as in formula I. The synthesis is illustrated by the preparation of the simplest compound of formula I wherein $R_1$ is methyl, and $R_2$ and $R_3$, hydrogen, which proceeds according to the following schematic equation:

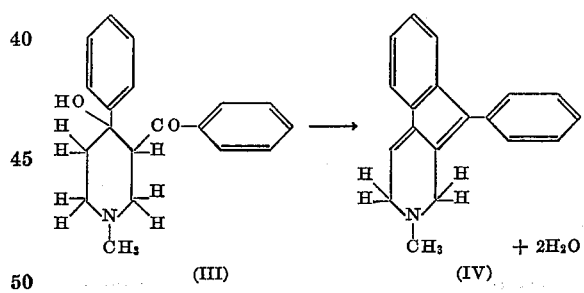

The starting compound III can be prepared by reacting formaldehyde, methylamine hydrochloride and acetophenone. According to Mannich and Heilner (Ber. 55, 356, 362 [1922]), formaldehyde, methylamine hydrochloride and acetophenone when boiled in alcohol react with the formation of a diketoamine (V). Warnat (C.A. 31, 2592 [1937]) found later that the Mannich and Heilner reaction not only yields the diketoamine (V)

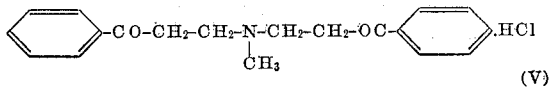

(V)

described by Mannich and Heilner, but proved that the reaction product contains in addition, the piperidine compound III, 1-methyl-3-benzoyl-4-phenyl-4-hydroxy piperidine, a fact which was further confirmed by Mannich and Hieronimus (Ber. 75, 49 (1942). Our own investigations of the synthesis of pyridindenes of type I have led to greatly improved methods for the synthesis not only of the compound of formula III, but also for new compounds of this type. This method forms the subject matter of our application Serial No. 721,674, filed January 11, 1947. We have found that the crude product of the reaction between formaldehyde, methylamine hydrochloride and acetophenone, which, according to the references above, comprises a mixture of the hydrochloride of the ketoamine compound of formula V and the hydrochloride of the compound of formula III, is converted almost completely into the cyclic compound of formula III, if the reaction mixture is made alkaline as, for example, with sodium hydroxide in aqueous solution and allowed to stand over a period of time ranging up to 24 hours. Thus the base III is obtained in high yields as a crystalline compound which can be recrystallized from methanol.

Furthermore, our investigations have led to other methods of condensing the formaldehyde, methylamine hydrochloride, and acetophenone which are superior to the ones described in the references cited above. These form the subject of our application Serial Number 721,673, filed January 11, 1947. Thus we have found that if the condensation is carried out in the absence of the alcohol, the reaction goes forth very vigorously with a considerable increase in the yield of the diketoamine V. We have found also, that if an excess of the acetophenone is employed as a diluent, yields of the diketoamine are also considerably increased. In another modification we have found that if we employ a chlorinated hydrocarbon, such as carbon tetrachloride, chloroform, and particularly tetrachloroethane as the diluent, instead of alcohol, large yields of the diketoamine of formula V are also obtained. The employment of tetrachloroethane is attended by the important advantage that the water formed during the reaction can be readily removed by distilling part of the tetrachloroethane, thereby increasing the yield of the diketoamine. Furthermore, the reaction product is almost insoluble in this solvent, thus obviating the recovery of the material by concentration of the mother liquors.

While our new procedure of condensation has been illustrated above in terms of the condensation between formaldehyde, methylamine hydrochloride and acetophenone, it is equally applicable to the production of salts of diketoamines represented by the general formula:

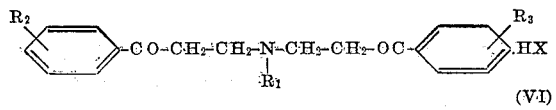

(VI)

wherein $R_1$, $R_2$ and $R_3$ have the same significance as already assigned thereto, and X is a monovalent acid radical. Thus in general, we can react a primary amine in the form of its salts, a formaldehyde such as formaldehyde, or a formaldehyde-yielding compound as, for example, formalin, paraformaldehyde, formaldehyde bisulfite, formaldehyde diethyl acetal, and the like with an acetophenone such as acetophenone or its ring-substituted derivatives such as alkyl- and alkoxy-acetophenone, as, for example, methyl-acetophenone, ethyl-acetophenone, methoxy-acetophenone, ethoxy-acetophenone and the like. Examples of suitable primary amines, in addition to methylamine, are ethylamine, isopropylamine, butylamine and the like.

In any event, either the crude reaction product (resulting from the condensation when an alcohol is employed as a solvent, or our new procedures of condensation) as well as the purified diketoamine of formula VI, can be converted into the piperidine of formula II by the aqueous alkaline treatment above mentioned. The resulting reaction product or the purified piperidine can then be converted into the pyridindene of formula I.

From the above schematic equation, it will be seen that the synthesis of our new heterocyclic base comprising the conversion of compound III into compound IV and more generally compounds of type II into componds of type I, involves the elimination of two molecules of water from the starting material, thereby creating a new five-membered ring and introducing two double bonds into the molecule. This conversion is readily effected by subjecting the starting material to a cyclizing and dehydrating agent such as for example, hydrobromic acid or sulfuric acid in aqueous solution. The reaction is preferably carried out at temperatures which may range, for example, from about 0° up to about 150° C. When sulfuric acid is employed, the starting material is treated with sulfuric acid of 50–100 per cent at temperatures ranging from about 0° to reflux. When employing hydrobromic acid, we find it advantageous to heat the starting material with this acid to a temperature of about 100° C., preferably to the reflux temperature of the mixture. In those cases where the starting compound of formula II contains an alkoxy group, we prefer to employ sulfuric acid as the ring-closing agent, since it avoids the danger of splitting or hydrolyzing the alkoxy groups.

In general, the resulting dihydro-1-pyridindene compounds are isolated in the form of their salts, or by dissolving in water and precipitating the free bases with an alkali. Especially advantageous is the isolation of the compounds in the form of their hydrobromides, since the hydrobromides can be readily crystallized, being comparatively slightly soluble in water and dilute hydrobromic acid. If sulfuric acid is employed as the cyclizing agent, the compounds are best isolated as the free bases which are then converted into the hydrobromides.

In an alternative procedure for preparing the pyridindenes of type I, we have found that high yields can be also obtained if the original reaction product between the formaldehyde, primary amine salt, and the acetophenone is not first subjected to alkali to transform it completely into the piperidine compound II, but is directly treated with aqueous hydrobromic acid. We believe that the treatment with aqueous hydrobromic acid first results in the conversion of the diketoamine of formula VI present in the reaction product into the piperidine derivative of type II and then cyclizes and dehydrates the latter compound to form the new compounds of type I. In the same manner the isolated N-di-(β-benzoylethyl)-alkylamines of formula VI can be converted into the pyridindene.

The new compounds constitute an entirely new and valuable class of heterocyclic amines. They can be hydrogenated to form new and valuable 2-alkyl-9-phenyl-tetrahydro-1-pyridindenes and 2-alkyl-9-phenyl-hexahydro-1-pyridindenes, which are useful for therapeutic purposes. These hydrogenated compounds are strong bases which are soluble in most organic solvents. They form salts with acids which are readily soluble in water, as well as quaternary salts.

The following examples will serve to illustrate our invention:

*Example 1*

A mixture of 750 grams of 1-methyl-3-benzoyl-4-hydroxy-4-phenyl-piperidine and 2500 cc. of 48% hydrobromic acid is refluxed for about 20 minutes. It is then poured into 8 liters of water. An oily precipitate appears which on standing crystallizes. It is filtered and crystallized from about 3.5 liters of alcohol. 2-methyl-9-phenyl-2,3-dihydro-1-pyridindene hydrobromide, M. P. 201–203° C., is obtained.

*Example 2*

10 grams of 1-methyl-3-benzoyl-4-hydroxy-4-phenyl-piperidine are dissolved in 50 cc. of sulfuric acid (65% by weight) and refluxed for about 30 minutes. After cooling the mixture is poured into water. The solution is made alkaline by addition of sodium hydroxide while cooling to about 30° C. An oil separates and is extracted with ether. The ether solution is saturated with gaseous hydrobromic acid. The hydrobromide separates. It is filtered and washed with acetone. 2-methyl-9-phenyl-2,3-dihydro-1-pyridindene hydrobromide is obtained, melting at 202–204° C.

*Example 3*

20 grams of 1-methyl-3-benzoyl-4-hydroxy-4-phenyl-piperidine are dissolved in 80 grams of 45% sulfuric acid (by weight) and warmed for three hours. The mixture is treated as in Example 2, yielding 2-methyl-9-phenyl-2,3-dihydro-1-pyridindene hydrobromide, M. P. 203–204° C.

*Example 4*

102 grams of 2-methyl-9-phenyl-2,3-dihydro-1-pyridindene hydrobromide are stirred with 500 cc. of water and 500 cc. of ether. One gram of sodium bisulfite is added and thereafter 40 cc. of 28 per cent aqueous ammonia is slowly added. The ether solution is separated and dried over sodium sulfate. Hydrogen chloride is bubbled through the solution. The hydrochloride separates as a sticky precipitate which on recrystallization from absolute alcohol yields pure 2-methyl-9-phenyl-2,3-dihydro-1-pyridindene hydrochloride, M. P. 195–197° C.

*Example 5*

50 grams of 2-methyl-9-phenyl-2,3-dihydro-1-pyridindene hydrobromide are stirred with 250 cc. of water. 10 grams of sodium bisulfite and 250 cc. of ligroin are added. The solution is cooled to about 20–25° C. and then 50 cc. of approximately 25% aqueous ammonia are added slowly. After stirring for two hours the mixture is filtered. There is obtained the free base, 2-methyl-9-phenyl-2,3-dihydro-1-pyridindene, melting at 150° C. after drying.

*Example 6*

A suspension of 147 grams of bis-(β-benzoylethyl)-ethylamine hydrochloride in 1000 cc. of water and 200 cc. of 10 per cent sodium hydroxide is stirred for 3 hours at 20–25° C., allowed to stand for about 18 hours and then stirred for an additional six hours. The precipitate is crystallized from ethanol or dilute methanol to give crystals of 1-ethyl-3-benzoyl-4-hydroxy-4-phenyl-piperidine, M. P. 100–102° C.

The bis-(β-benzoylethyl)-ethylamine hydrochloride is obtained as follows:

A mixture of 41 grams of ethylamine hydrochloride, 120 grams of acetophenone and 30 grams of paraformaldehyde is heated with stirring. At about 80° C. a vigorous reaction occurs, the temperature rising to about 120° C. Stirring and heating are discontinued at the start of the vigorous reaction, and stirring is resumed after it subsides. When the temperature has dropped to about 65° C., 300 cc. of ethyl acetate are added and the solution allowed to crystallize. In this manner, 147 grams of bis-(β-benzoylethyl)-ethylamine hydrochloride are obtained. The material is purified by recrystallization from alcohol and has a M. P. of 138–139° C.

*Example 7*

A mixture of 46 grams of 1-ethyl-3-benzoyl-4-hydroxy-4-phenyl-piperidine and 185 cc. of 48 per cent hydrobromic acid is distilled slowly over a period of 30 minutes until the temperature rises to 122° C. The mixture is poured into water and the precipitate is crystallized from alcohol, yielding 2-ethyl-9-phenyl-2,3-dihydro-1-pyridindene hydrobromide, M. P. 203–204° C.

*Example 8*

96 grams of isopropylamine hydrochloride, 240 grams of acetophenone, 120 grams of paraformaldehyde and 250 cc. of alcohol are refluxed for 6 hours. The solvent is distilled off under reduced pressure. To the residue about 400 cc. of ethyl acetate are added. On standing and occasional scratching, a crystalline precipitate is formed. It is filtered, suspended in 1000 cc. of water and the solution stirred with 200 cc. of 10% sodium hydroxide for about one hour. An oil appears, which on standing turns solid. It is recrystallized from about 300 cc. of methanol. 1-isopropyl-3-benzoyl-4-hydroxy-4-phenyl-piperidine is thus obtained in colorless crystals, M. P. 120–122° C.

*Example 9*

40 grams of the piperidine obtained as in Example 8 and 170 cc. of 48% hydrobromic acid are refluxed for about 25 minutes, and then the mixture is poured into 340 cc. of water. A precipitate is formed. It is filtered, digested with 400 cc. of hot alcohol, and filtered hot. The crystals are 2-isopropyl-9-phenyl-2,3-dihydro-1-pyridindene hydrobromide, M. P. 243–245° C.

*Example 10*

A mixture of 55 grams of n-butylamine hydrochloride, 120 grams of acetophenone, 30 grams of paraformaldehyde and 150 cc. of alcohol is refluxed for several hours. The solvent is distilled off and the residue treated with a dilute solution of sodium hydroxide. After stirring for several hours, the oily base which is formed first, becomes solid. It is filtered and recrystallized from methanol, yielding 1-n-butyl-3-benzoyl-4-hydroxy-4-phenyl-piperidine, M. P. 94–96° C.

Example 11

20 grams of the piperidine base obtained as in Example 10 are dissolved in 80 cc. of 48% hydrobromic acid. The mixture is refluxed, using a column to remove the aqueous hydrobromic acid, until the temperature of the mixture is 122–125° C. It is then poured into 160 cc. of water, and the precipitate is crystallized from acetone. 2-n-butyl-9-phenyl-2,3-dihydro-1-pyridindene hydrobromide is obtained, melting at 193–195° C.

Example 12

A mixture of 250 grams of p-methyl-acetophenone, 63 grams of methylamine hydrochloride, 55 grams of paraformaldehyde and 225 cc. of ethyl alcohol is refluxed for 2½ to 3 hours. The solvent is removed under reduced pressure. The residue is digested with 200 cc. of ethylacetate. After standing for several hours the solid is filtered and crystallized from about 300 cc. of ethanol. The resulting hydrochloride is stirred vigorously with 10 grams of sodium hydroxide and 540 cc. of water for about one hour at room temperature. On standing the base solidifies. It is filtered and recrystallized from alcohol. Further crystallization from methanol gives pure 1-methyl-3-(p-methylbenzoyl)-4-hydroxy-4-(p-tolyl)-piperidine, M. P. 140–143° C.

Example 13

20 grams of the piperidine derivative obtained as in Example 12 and 80 cc. of 48% hydrobromic acid are refluxed for 30 minutes. The mixture is poured into 160 cc. of water. The precipitate is filtered and recrystallized from about 150 cc. of ethanol. The crude hydrobromide is crystallized from acetic acid, yielding 2,7-dimethyl-9-(p-tolyl)-2,3-dihydro-1-pyridindene hydrobromide, M. P. 200–203° C.

Example 14

A mixture of 134 grams of m-methoxyacetophenone, 34 grams of methylamine hydrochloride, and 30 grams of paraformaldehyde is refluxed in alcohol for several hours. The alcohol is removed, and the residue is added to 600 cc. of water. The aqueous solution is extracted twice with ether, then 240 cc. of 10% sodium hydroxide is added. An oily base separates and is extracted with ether. The solution in ether is dried. An ethereal solution of oxalic acid is added until no further precipitate is formed. The precipitate is filtered and digested with 400 cc. of hot acetone. The oxalate is then stirred with a solution of 20 grams of sodium hydroxide in 1200 cc. of water for 2½ hours. After standing overnight, a solid is obtained. On recrystallization from methanol, 1-methyl-3-(m-methoxybenzoyl)-4-hydroxy-4-(m-methoxyphenyl)-piperidine, M. P. 104–106° C., is obtained.

Example 15

2 grams of the piperidine compound as prepared in Example 14 are added slowly to 12 cc. of concentrated sulfuric acid, while the temperature is kept at 0–10° C. by means of an ice-bath. After 20 minutes the mixture is poured onto cracked ice. At a temperature not exceeding 30° C. a solution of sodium hydroxide is added until the mixture reacts distinctly alkaline. A base is liberated which is next extracted with ether. The ethereal solution is treated with gaseous hydrobromic acid. On standing in the cold, crystals slowly appear. They are filtered and recrystallized from alcohol. 2-methyl-6-(or 8)-methoxy-9-(m-methoxyphenyl)-2,3-dihydro-1-pyridindene hydrobromide, M. P. 209–210° C., is obtained.

Example 16

A mixture of 500 grams of N-di-(β-benzoylethyl)-methylamine hydrochloride and 2000 cc. of 48% hydrobromic acid are refluxed for a period of about one hour. Hydrogen chloride was given off, and the temperature rose to 122° C. The contents are poured into 4 liters of cold water. A precipitate formed, which is filtered. The yellow crystals are purified by recrystallization from 1800 cc. of ethyl alcohol. The pure 2-methyl-9-phenyl-2,3-dihydro-1-pyridindene hydrobromide formed has a M. P. of 200–203° C.

In general, to form the 2-alkyl-9-phenyl-tetrahydro- and hexahydro-1-pyridindenes, the 2-alkyl-9-phenyl-2,3-dihydro-1-pyridindenes per se or their salts can be hydrogenated. We prefer to hydrogenate the salts since the salts are more stable than the free base. The salts with hydrohalic acids, such as the hydrochloride or the hydrobromide salts of 2-alkyl-9-phenyl-2,3-dihydro-1-pyridindenes are particularly suitable for hydrogenation to the tetrahydro and hexahydro derivatives. In practice, the use of the hydrobromide salts is preferred, since the hydrobromides are readily obtained in the synthesis of the dihydro compounds, and therefore no additional handling or treatment to prepare the intermediates for hydrogenation is required.

Hydrogenation of the 2-alkyl-9-phenyl-2,3-dihydro-1-pyridindenes and the salts thereof with acids, yields the corresponding tetrahydro- or hexahydro-1-pyridindene derivatives depending on the conditions of the hydrogenation. Thus, when carrying out the hydrogenation with such hydrogenation catalysts, as, for example, palladium on charcoal, and Raney nickel, at temperatures not exceeding about 80–100° C., two atoms of hydrogen are taken up by each molecule of the dihydro compound and the 2-alkyl-9-phenyl-tetrahydro-1-pyridindene derivatives are obtained. In practice, temperatures of 20–40° C. are preferred in carrying out the hydrogenation to form the tetrahydro compounds since no external heating is necessary. With platinum oxide (Adams catalyst) the tetrahydro derivatives are obtained when the hydrogenation is carried out at temperatures of about 20–30° C.

On the other hand, when such hydrogenation catalysts as platinum oxide and palladium oxide, are employed at elevated temperatures, ranging from about 70–140° C., four atoms of hydrogen are taken up by each molecule of the dihydro compound, and the hexahydro derivatives, namely, 2-alkyl-9-phenyl-2,3,4,4a,9,9a-hexahydro-1-pyridindenes and their salts are obtained. The hexahydro compounds are more stable than the tetrahydro derivatives.

The hydrogenation of the 2-alkyl-9-phenyl-2,3-dihydro-1-pyridindenes and their salts may be carried out while the compounds are suspended or dissolved in any suitable solvent. As suitable solvents, there can be employed, for example, water, and/or alcohols, as for instance, methanol, ethanol, and the like. When Raney nickel is employed as the catalyst, it is preferred not to employ a too acid solution, since it is known that nickel becomes inactivated and partly dissolves at a pH below about 4.5–5. The pressure under which the hydrogenation is carried out can vary over a wide range. Pressures from atmospheric to about 2000 p. s. i. or higher can be employed.

The 2-alkyl-9-phenyl-2,3-dihydro-1-pyridindene hydrobromides are generally only slightly soluble at room temperature. However, it is not necessary to have the starting dihydro derivatives entirely in solution in order to effect hydrogenation. A suspension can be hydrogenated without any difficulties, since the hydrogenation products are much more soluble.

The tetrahydro compounds can be isolated in the form of the free base by treating the solution obtained on hydrogenation with, for example, an alkali metal hydroxide, as sodium hydroxide, potassium hydroxide, or ammonium hydroxide. The free base generally separates as an oil which gradually crystallizes. It can be purified by crystallizing from a suitable solvent, as, for example, acetone or alcohol and can be converted into salts with acids.

Certain salts can also be obtained without isolation of the free base by directly treating the solution obtained on hydrogenating the 2-alkyl-9-phenyl-2,3-dihydro-1-pyridindene salts, such as the hydrobromide or hydrochloride, with alkali metal salts of such acids which form insoluble or difficultly soluble salts with the bases. Examples of such salts are sodium, potassium and ammonium thiocyanates, monopotassium phosphate, and sodium salicylate. In the case of the 2-methyl and 2-ethyl-9-phenyl-tetrahydro-1-pyridindenes the thiocyanates are particularly suitable, due to the insolubility and excellent crystallizability of the thiocyanate salts of these compounds. The salts precipitate out from the solution, and can be purified in general by crystallization from suitable solvents as, for instance, alcohol, acetone, or mixtures thereof with water. The salts on addition of alkaline agents, such as, for example, those mentioned above, yield the free bases.

Other salts can be prepared by starting from the 2-alkyl-9-phenyl-tetrahydro-1-pyridindene thiocyanates. The thiocyanate is treated, preferably in aqueous suspension, with an alkali metal base, such as sodium hydroxide or ammonium hydroxide and the liberated base thus obtained is taken up in a water-immiscible solvent such as ether, benzene, toluene or the like. Addition of an equimolecular amount of an acid will produce the corresponding salt. Thus, with aqueous hydrochloric and hydrobromic acid, the hydrochloride and hydrobromide are formed. These are obtained in crystalline form by evaporation to dryness and crystallization from a suitable solvent. The addition of maleic acid yields the maleate. The tartrate can be prepared by the addition of tartaric acid as such, or in suspension in a solvent like acetone, or dissolved in a solvent such as methanol or ethanol, to the solution of the free base as in ether, benzene, toluene or methylene chloride.

The 2-alkyl-9-phenyl-2,3-dihydro-1-pyridindenes, the 2-alkyl-9-phenyl-tetrahydro- and hexahydro-1-pyridindenes are converted into quaternary salts in the usual manner, as by treating with methyl halides, as for example, methyl bromide, methyl iodide, methyl chloride, and methyl para-toluenesulfonate, dimethyl sulfate, and the like.

The following examples will serve to illustrate the preparation of the tetrahydro- and hexahydro compounds.

Example 17

A mixture of 680 grams of 2-methyl-9-phenyl-2,3-dihydro-1-pyridindene hydrobromide, 6000 cc. of water and 200 cc. of moist Raney nickel catalyst is hydrogenated under a pressure of 500 p. s. i. for three hours at 20–30° C. By the end of this time the hydrobromide has gone into solution. The catalyst is filtered and the filtrate is treated at 20–30° C. with a solution of 240 grams of potassium thiocyanate in 400 cc. of water and allowed to stand with occasional stirring for about 30 minutes. The supernatant solution is decanted from the precipitate to which is added 10 liters of boiling alcohol under nitrogen. After cooling to 20–30° C. under nitrogen and standing for about 18 hours, 2-methyl-9-phenyl-tetrahydro-1-pyridindene thiocyanate with a M. P. of 188–189° C. is obtained. Concentration of the mother liquid to one-quarter of its original volume gives an additional amount of this thiocyanate.

Example 18

A solution obtained by hydrogenation of 2 - methyl - 9 - phenyl-2,3-dihydro-1-pyridindene hydrobromide as described in Example 17 is filtered from the catalyst. To the filtrate a concentrated solution of potassium dihydrogen phosphate in water is added in excess. The mixture remains clear, but after standing for about 15 hours, crystals separate. The solution is then cooled and the crystals formed are filtered and purified by crystallization from water. 2-methyl-9-phenyl-tetrahydro-1-pyridindene less phosphate crystallizes with ½ mol of water. It has a M. P. of 148–150° C.

Example 19

188 grams of 2-methyl-9-phenyl-2,3-dihydro-1-pyridindene hydrobrobide is hydrogenated in the same manner as described in Example 17. To the filtrate is added a solution of 465 grams of sodium salicylate in 500 cc. of water and the mixture allowed to stand 30 minutes with occasional stirring. The supernatant solution is decanted from the precipitate which is crystallized from 200 cc. of ethyl alcohol. 2-methyl-9-phenyl-tetrahydro-1-pyridindene salicylate is thus obtained which melts at 159–161° C.

Example 20

A mixture of 20 grams of 2-methyl-9-phenyl-tetrahydro-1-pyridindene thiocyanate, 250 cc. of ether, 400 cc. of water and 275 cc. of 10 per cent sodium hydroxide in water is shaken until solution of the thiocyanate occurs. The ether layer containing the free base is washed with water and treated with an equivalent amount of 1 N hydrochloric acid. The mixture is evaporated to dryness at 55° C. in vacuo and the residue is crystallized from acetone. 2-methyl-9-phenyl-tetrahydro-1-pyridindene hydrochloride having a M. P. of 151–154° C. is obtained.

Example 21

To an ether solution of the free base as obtained in Example 20 is added with stirring a solution of maleic acid in ether until no further precipitation occurs. The maleate of 2-methyl-9-phenyl-tetrahydro-1-pyridindene having a M. P. of 169–171° C. is obtained.

Example 22

A mixture of 10 grams of 2-methyl-9-phenyl-tetrahydro-1-pyridindene thiocyanate, 150 cc. of ether, 100 cc. of water and 25 cc. of 10 per cent aqueous sodium hydroxide is shaken until the thiocyanate goes into solution. The ether layer is washed with water and treated with an equivalent amount of 0.1 N hydrobromic acid. The mixture is evaporated to dryness at reduced pressure and is crystallized from acetone. The 2-methyl-9-phenyl-tetrahydro-1-pyridindene hydrobromide thus obtained melts at 122–126° C. The substance is hygroscopic and quite soluble in water.

Example 23

A mixture of 360 grams of 2-methyl-9-phenyl-tetrahydro-1-pyridindene thiocyanate, 3000 cc. of water, 3500 cc. of ether and 900 cc. of 10 per cent sodium hydroxide is shaken until the thiocyanate goes into solution. After washing with water, the ether solution is treated with a solution of 174 grams of tartaric acid in 900 cc. of ethyl alcohol. The 2-methyl-9-phenyl-tetrahydro-1-pyridindene tartrate, M. P. 158–160° C. is obtained. The ether in this example can be replaced with either benzene or toluene and the tartaric acid may be added either in powdered form, or in conjunction with a suitable solvent such as acetone or methanol. Instead of sodium hydroxide, dilute ammonia may be employed for the liberation of the free base.

Example 24

A solution of 10 grams of 2-methyl-9-phenyl-tetrahydro-1-pyridindene salicylate in 20 cc. of 50 per cent ethyl alcohol is treated with 11 cc. of a 10 per cent sodium hydroxide solution. On standing with occasional scratching, a quantitative yield of the free base, having a M. P. 89–91° C. is obtained.

The free base can be represented by the following formula:

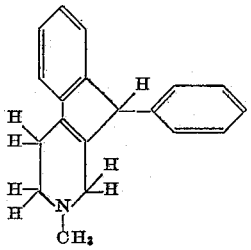

Example 25

A mixture of 100 grams of 2-methyl-9-phenyl-tetrahydro-1-pyridindene thiocyanate, 200 cc. of ethyl alcohol, 80 cc. of 28 per cent ammonium hydroxide and 120 cc. of water is stirred for about 18 hours. Filtration of the mixture yields 2-methyl-9-phenyl-tetrahydro-1-pyridindene. Additional base can be obtained by diluting the filtrate with 100 cc. of water.

Example 26

A solution of 50 grams of 2-methyl-9-phenyl-tetrahydro-1-pyridindene tartrate in 400 cc. of 50 per cent ethyl alcohol is treated with 500 cc. of ethyl alcohol and 98 cc. of 10 per cent sodium hydroxide with cooling. After standing at 0–5° C. for 18 hours the mixture is filtered from sodium tartrate. Water is added to the filtrate from time to time inducing crystallization of the free base.

Example 27

A mixture of 68 grams of 2-methyl-9-phenyl-2,3-dihydro-1-pyridindene hydrobromide in 125 cc. of ethyl alcohol and 20 cc. of Raney nickel catalyst is hydrogenated at 10–50 p. s. i. at 20–25° C. for four hours. About one mol of hydrogen is absorbed per mol of compound. The catalyst is filtered. When the filtrate is treated with sodium hydroxide or ammonia, 2-methyl-9-phenyl-tetrahydro-1-pyridindene is obtained.

Example 28

A mixture of 15 grams of 2-methyl-9-phenyl-2,3-dihydro-1-pyridindene hydrobromide, 150 cc. of water and 40 cc. of Raney nickel is hydrogenated at 40–50 p. s. i. for 2.5 hours. About one mol of hydrogen is absorbed per mol of compound. The catalyst is filtered and the filtrate can be treated in the same manner as described in Examples 17, 18 and 19 to obtain various salts.

Example 29

A mixture of 3.4 grams of 2-methyl-9-phenyl-2,3-dihydro-1-pyridindene hydrobromide, 150 cc. of ethyl alcohol and 0.100 gram of platinum oxide (Adams catalyst) is hydrogenated at 30–50 p. s. i. for about an hour at 20–25° C. Approximately one mol of hydrogen is absorbed per mol of compound. The catalyst is filtered and the filtrate can be treated as described in Example 27 to produce the free base.

Example 30

A mixture of 14 grams of 2-methyl-9-phenyl-2,3-dihydro-1-pyridindene hydrobromide, 150 cc. of water, 2 cc. of constant boiling hydrochloric acid and 1 gram of palladium on charcoal catalyst containing 10 per cent palladium, is hydrogenated at 40-50 p. s. i. for about 1.5 hours at 20–25° C. Approximately one mol of hydrogen is absorbed per mol of compound. The catalyst is filtered, the filtrate is adjusted to a pH of about 6 and then treated as in Examples 17, 18 and 19 to obtain the various salts as described above.

Example 31

A mixture of 400 grams of 2-methyl-9-phenyl-dihydro-1-pyridindene hydrobromide, 800 cc. of ethyl alcohol and 100 cc. of Raney nickel is hydrogenated at about 1000 p. s. i. for four hours at about 20–25° C. The catalyst is filtered and the filtrate is stirred for about 18 hours with 800 cc. of 28 per cent ammonium hydroxide. The bulk of 2-methyl-9-phenyl-tetrahydro-1-pyridindene crystallizes. Additional amounts of the base can be obtained by diluting the filtrate with 500 cc. of water. Purification of the base is easily carried out by crystallization from 70 per cent aqueous acetone.

Example 32

100 grams of 2-methyl-9-phenyl-tetrahydro-1-pyridindene in 1000 cc. of benzene is treated with solution of 57.5 grams of tartaric acid in 290 cc. of ethyl alcohol. On standing, the tartrate of M. P. 160–164° C. is obtained. Instead of employing benzene, toluene, ether, or methylene chloride can be utilized as the solvent for the free base.

Example 33

15 grams of 2-methyl-9-phenyl-2,3-dihydro-1-pyridindene hydrogenated for seven hours in 30 cc. of methanol with 3 grams of Raney nickel at 20–25° C. and 500 p. s. i. The reaction mixture is filtered and the filtrate is evaporated in vacuo. The residue is shaken with water and ether. The ether layer is extracted with 10% hydrochloric acid. The acid extract is adjusted to pH of 6.5 with ammonia. A solution of 10 grams of potassium thiocyanate is added until no further precipitate occurs. The precipitate crystallizes on standing. It is filtered and recrystallized from absolute alcohol. Pure 2-methyl-9-phenyl-tetrahydro-1-pyridindene thiocyanate of M. P. 187–189° C. is obtained.

Example 34

A mixture of 680 grams of 2-methyl-9-phenyl-2,3-dihydro-1-pyridindene hydrobromide, 6000 cc. of water and about 100 grams of Raney-nickel catalyst is hydrogenated at room temperature and at about 1000 lbs. pressure for a period of three hours. The catalyst is filtered. The clear filtrate is treated with a solution of 240 grams potassium thiocyanate in 400 cc. of water. A heavy solid precipitates from which the supernatant liquid is decanted. The residue is dissolved in 10 liters of boiling alcohol with stirring in the presence of nitrogen. The solution is cooled to room temperature under nitrogen, and then allowed to stand overnight. 2-methyl-9-phenyl-tetrahydro-1-pyridindene thiocyanate separates in crystals of M. P. 188–189° C. From the concentrated filtrate an additional amount is obtained. The corresponding free base, prepared by treating the slightly soluble thiocyanate in aqueous suspension with sodium hydroxide and extracting with ether, has a M. P. of 90–91° C. It forms a tartrate of M. P. 160° C.

Example 35

A mixture of 17 grams of 2-methyl-9-phenyl-2,3-dihydro-1-pyridindene hydrobromide, 150 cc. of ethanol, and 0.5 gram of platinum oxide catalyst is hydrogenated at 60 lbs. pressure at about 75° C. until no further absorption of hydrogen is noticed. About four hours is required. The catalyst is filtered and the filtrate allowed to stand at room temperature for one day. 8.9 grams of 2-methyl-9-phenyl-hexahydro-1-pyridindene hydrobromide, M. P. 243–246° C., crystallizes. An additional amount is obtained from the filtrate by concentrating to one-half of the original volume and chilling.

Example 36

A mixture of 17 grams of 2-methyl-9-phenyl-2,3-dihydro-1-pyridindene hydrobromide, 150 cc. of methanol and 0.5 gram of palladium oxide is hydrogenated at 500 p. s. i. and at about 120° C. for five hours. About two mols of hydrogen are absorbed per mol of compound. The solution is filtered and evaporated to dryness. The residue is crystallized from alcohol, yielding 2-methyl-9-phenyl-2,3,4,4$a$,9,9$a$-hexahydro-1-pyridindene hydrobromide, M. P. 243–246° C.

Example 37

6 grams of 2-methyl-9-phenyl-2,3-dihydro-1-pyridindene hydrochloride are hydrogenated in 50 cc. of water with about 5–6 grams of Raney nickel catalyst at 20–25° C. and 600 p. s. i. for about 2 hours. The solution is filtered and an aqueous solution of 2.5 grams of potassium thiocyanate is added. The crude precipitate is recrystallized from alcohol, yielding 2-methyl-9-phenyl-tetrahydro-1-pyridindene thiocyanate.

Example 38

14.8 grams of 2-methyl-9-phenyl-2,3-dihydro-1-pyridindene hydrochloride are hydrogenated with 1 gram of palladium oxide catalyst in 150 cc. of methanol at 120° C. and 500 p. s. i. The solution is filtered and evaporated. The residue is recrystallized from alcohol, yielding 2-methyl-9-phenyl-2,3,4,4$a$,9,9$a$-hexahydro-1-pyridindene hydrochloride, M. P. 261° C.

Example 39

A mixture of 14 grams of 2-ethyl-9-phenyl-2,3-dihydro-1-pyrindindene hydrobromide, 150 cc. of water, and 10 cc. of Raney nickel is hydrogenated at 40–60 p. s. i. at about 20–25° C. for about three hours. About one mol of hydrogen is absorbed per mol of compound. The catalyst is filtered and the filtrate treated with 5 grams of potassium thiocyanate in 20 cc. of water. After 30 minutes the supernatant solution is decanted and the precipitate is crystallized from 60 cc. of ethyl alcohol. A yield of 2-ethyl-9-phenyl-tetrahydro-1-pyridindene thiocyanate is formed which melts at 160–162° C.

Example 40

A mixture of 18 grams of 2-ethyl-9-phenyl-2,3-dihydro-1-pyridindene hydrobromide, 50 cc. of ethyl alcohol and 0.5 gram of platinum oxide is hydrogenated at 15 to 50 p. s. i. at 70° C. for about 4.5 hours. The catalyst is filtered and on cooling the filtrate, 2-ethyl-9-phenyl-2,3,4,4$a$,9,9$a$-hexahydro-1-pyridindene hydrobromide is obtained with a M. P. of 248–251° C.

Example 41

A mixture of 20 grams of 2-isopropyl-9-phenyl-2,3-dihydro-1-pyridindene hydrobromide, 150 cc. of ethyl alcohol and 10 cc. of moist Raney nickel catalyst is hydrogenated at 30–50 p. s. i. at about 25° C. during a period of 5.5 hours. The mixture is filtered and the filtrate is concentrated to a weight of 52 grams and then stirred for about 18 hours with 40 cc. of 29 per cent aqueous ammonium hydroxide. After standing at 0–5° C. for about 72 hours, the mixture is distilled in vacuo to remove the alcohol. To the residue, 20 cc. of 29 per cent aqueous ammonium hydroxide are added and the whole extracted with ether. After washing with water and drying with sodium sulfate, the ether extract is treated with an ethereal solution of oxalic acid until no further precipitation occurs. The precipitate is crystallized from acetone, yielding the oxalate. The oxalate is recrystallized from 50 per cent aqueous ethyl alcohol. 2-isopropyl-9-phenyl-tetrahydro-1-pyridindene oxalate melts at 182–184° C.

Example 42

A mixture of 50 grams of 2,7-dimethyl-2,3-dihydro-9-p-tolyl-1-pyridindene hydrobromide, 150 cc. of ethyl alcohol and 15 cc. of moist Raney nickel catalyst is hydrogenated at about 20–50 p. s. i. and about 25° C. for about 7 hours. The mixture is filtered and stirred for about 18 hours with 150 cc. of 29 per cent aqueous ammonium hydroxide. The mixture is allowed to stand for 96 hours at 0–5° C. and then distilled in vacuo to remove most of the alcohol. The residue is extracted with ether and the ether extract is washed with water, dried with sodium sulfate and treated with an ethereal solution of oxalic acid until no further precipitation occurs. The crude oxalate salt thus obtained is crystallized from ethyl alcohol, yielding 2,7-dimethyl-9-p-tolyl-tetrahydro-1-pyridindene oxalate melting at 183–186° C.

In a similar manner as illustrated in the above examples, other dihydro-1-pyridindenes and the salts thereof can be hydrogenated to the corresponding tetra- and hexahydro-1-pyridindenes. The 2-alkyl-9-phenyl-hexahydro-1-pyridindenes can be represented by the following general formula:

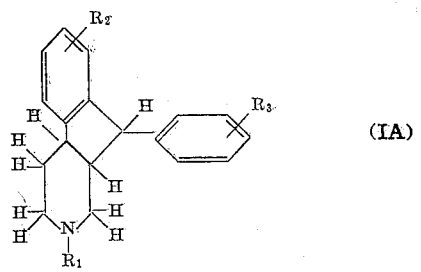

and the 2-alkyl-9-phenyl-tetrahydro-1-pyridindenes by the following general formula:

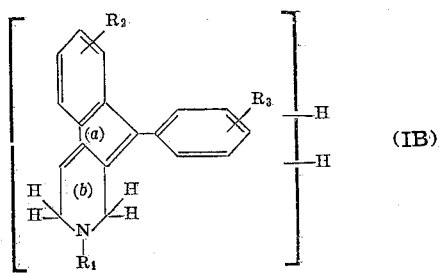

the two hydrogen atoms shown in formula (IB) being attached to the nonbenzeneoid rings (a) and (b), and $R_1$, $R_2$ and $R_3$ having the same significance already assigned thereto. It is to be understood that the claims are intended to cover all metaisomeric forms.

The following examples will serve to illustrate the procedure for producing the quaternary salts of the 2-alkyl-9-phenyl-hydro-1-pyridindenes.

Example 43

1 gram of 2-methyl-9-phenyl-tetrahydro-1-pyridindene is dissolved in 10 cc. of methanol. 2 grams of methyliodide are added at about 20° C. The mixture is allowed stand for about 24 hours. It is then evaporated in vacuo. The residue is dissolved in 40 cc. of 60 per cent alcohol, and 5 grams of freshly precipitated silver chloride are added. The mixture is shaken for 24 hours on the shaking machine. The solids are then filtered, and the filtrate is distilled to dryness. The residue is recrystallized from alcohol-ether, yielding 2,2-dimethyl - 9 - phenyl-tetrahydro-1-pyridindenium chloride, M. P. 251° C. (with decomposition).

Example 44

5 grams of 2-methyl-9-phenyl-2,3-dihydro-1-pyridindene are dissolved in 4 cc. of methyliodide. The mixture warms up. After about two hours the formed crystals are filtered, and recrystallized from alcohol. 2,2-dimethyl-9-phenyl-2,3-dihydro-1-pyridindenium iodide of M. P. 185° C. is obtained.

Example 45

A solution of 10.44 grams of 2-methyl-tetrahydro-9-phenyl-1-pyridindene, 100 cc. of benzene, and 7.44 grams of methyl p-toluenesulfonate is refluxed 23 minutes and allowed to stand for about 18 hours, or until crystallization is complete. The crystals of 2,2 - dimethyl-9-phenyl - tetrahydro-1-pyridindenium-p-toluenesulfonate obtained on filtering melt at 110–114° C.

Example 46

6 grams of 2-methyl-9-phenyl-hexahydro-1-pyridindene are dissolved in 50 cc. of ether. 5 cc. of methyliodide are added. The mixture is allowed to stand for 24 hours at 20–30° C. The precipitate is filtered and is recrystallized from alcohol. 2,2-dimethyl - 9 - phenyl-hexahydro-1-pyridindenium iodide of M. P. 292–293° C. is obtained.

Example 47

25 grams of 2-methyl-9-phenyl-hexahydro-1-pyridindene hydrobromide are dissolved in 50 cc. of alcohol. 50 cc. of 25 per cent ammonia are slowly added with stirring. The mixture is then diluted with 30 cc. of water. The base separates as an oil. It is separated, suspended in water, and the mixture is stirred for 10 hours at 20–30° C. The oil solidifies slowly. It is filtered and recrystallized from an acetone-water solution, yielding 2-methyl - 9 - phenyl-hexahydro-1-pyridindene melting at 78–80° C.

We claim:

1. A compound selected from the group consisting of a 2-alkyl-9-phenyl-dihydro-1-pyridindene, the corresponding hydrogenated compounds, and the salts, said 2-alkyl-9-phenyl-dihydro-1-pyridindene being represented by the formula:

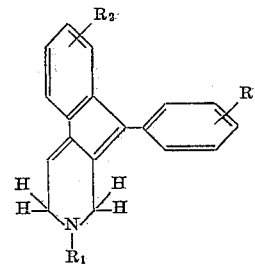

$R_1$ being an alkyl group, and $R_2$ and $R_3$ being a member of the group consisting of hydrogen, alkyl and alkoxy radicals.

2. A 2 - alkyl-9-phenyl-dihydro-1-pyridindene corresponding to the following formula and the salts thereof.

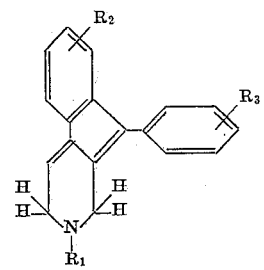

$R_1$ being an alkyl group, and $R_2$ and $R_3$ being a member of the group consisting of hydrogen, alkyl and alkoxy radicals.

3. A 2 - alkyl-9-phenyl-tetrahydro-1-pyridindene corresponding to the following formula and the salts thereof:

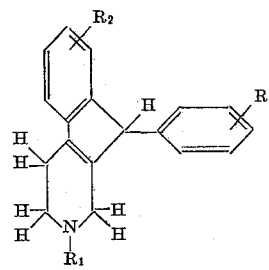

$R_1$ being an alkyl group, and $R_2$ and $R_3$ being a member of the group consisting of hydrogen, alkyl and alkoxy radicals.

4. A 2 - alkyl-9-phenyl-hexahydro-1-pyridindene corresponding to the following formula and the salts thereof:

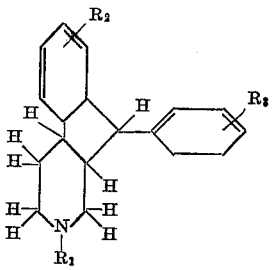

R₁ being an alkyl group, and R₂ and R₃ being a member of the group consisting of hydrogen, alkyl and akoxy radicals.

5. 2 - methyl - 9 - phenyl - dihydro - 1 - pyridindene corresponding to the following formula and the salts thereof:

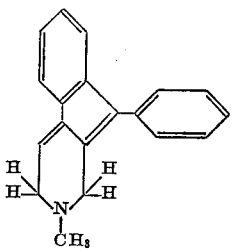

6. 2 - methyl - 9 - phenyl - dihydro - 1 - pyridindene hydrobromide, the free base of which can be represented by the following formula:

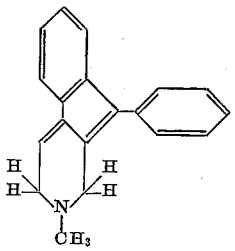

7. 2 - methyl - 9 - phenyl - tetrahydro - 1 - pyridindene corresponding to the following formula and the salts thereof:

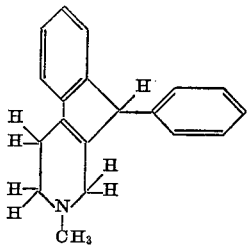

8. 2 - methyl - 9 - phenyl - tetrahydro - 1 - pyridindene tartrate, the free base of which can be represented by the formula:

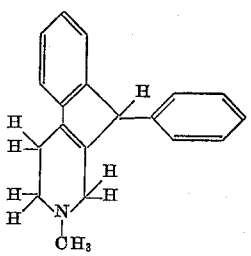

9. 2 - methyl - 9 - phenyl - hexahydro - 1 - pyridindene corresponding to the following formula and the salts thereof

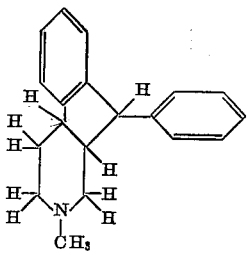

10. A process which comprises cyclizing and dehydrating the reaction product of a primary alkyl amine salt, a formaldehyde and an acetophenone with an acid selected from the group consisting of hydrobromic and sulfuric acid so as to produce a 2-alkyl-9-phenyl-dihydro-1-pyridindene which can be represented by the formula:

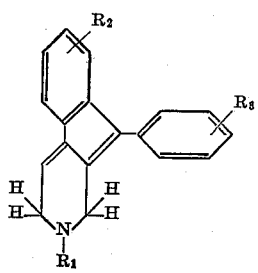

and catalytically hydrogenating the last mentioned compound to form the corresponding hydrogenated pyridindenes, R₁ being a lower alkyl group, and R₂ and R₃ being a member of the group consisting of hydrogen, alkyl and alkoxy.

11. A process which comprises cyclizing and dehydrating the reaction product of a primary alkyl amine salt, a formaldehyde and an acetophenone with an acid selected from the group consisting of hydrobromic and sulfuric acid so as to produce a 2-alkyl-9-phenyl-dihydro-1-pyridindene which can be represented by the formula:

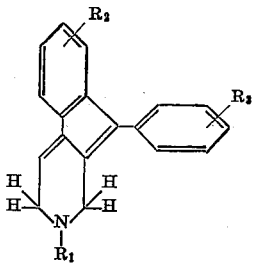

R₁ being a lower alkyl group, and R₂ and R₃ being a member of the group consisting of hydrogen, alkyl and alkoxy.

12. A process as in claim 10 wherein the acid employed is hydrobromic acid.

13. A process which comprises cyclizing and dehydrating the reaction product of formaldehyde, methylamine hydrochloride and acetophenone with hydrobromic acid so as to produce a 2- methyl-9-phenyl-dihydro-1-pyridindene of the following formula:

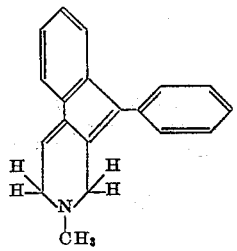

14. A process which comprises reacting a bis-(β-benzoylethyl)-alkylamine salt with aqueous hydrobromic acid, so as to produce a 2-alkyl-9-phenyl-dihydro-1-pyridindene which can be represented by the following formula:

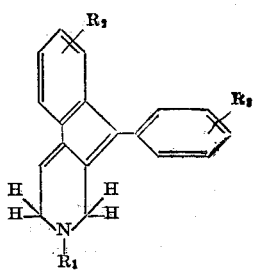

$R_1$ being an alkyl group, and $R_2$ and $R_3$ being a member of the group consisting of hydrogen, alkyl and alkoxy radicals.

15. A process which comprises reacting di-(β - benzoylethyl) - methylamine hydrochloride with hydrobromic acid so as to produce a 2-methyl-9-phenyl-dihydro-1-pyridindene of the following formula:

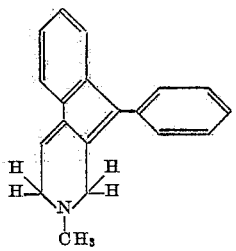

16. A process which comprises reacting a 1-alkyl-3-benzoyl-4-hydroxy- 4 - phenyl - piperidine of the following formula:

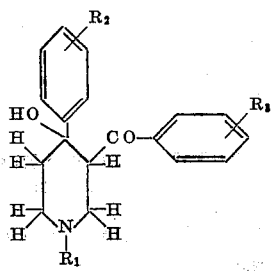

with an acid of the group consisting of sulfuric and hydrobromic acid so as to produce a 2-alkyl-9-phenyl-dihydro-1-pyridindene which can be represented by the following formula:

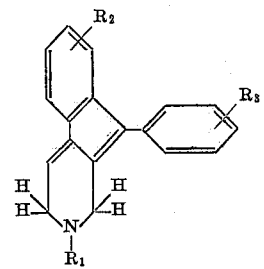

$R_1$ being an alkyl group, and $R_2$ and $R_3$ being a member of the group consisting of hydrogen, alkyl and alkoxy radicals.

17. A process which comprises reacting 1-methyl-3-benzoyl- 4 -hydroxy- 4 -phenyl- piperidine with hydrobromic acid so as to produce a 2-methyl-9-phenyl-dihydro-1-pyridindene which can be represented by the following formula:

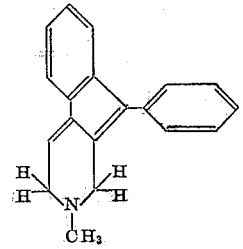

18. A process which comprises catalytically hydrogenating a 2-alkyl-9-phenyl-dihydro-1-pyridindene of the following formula and its salts:

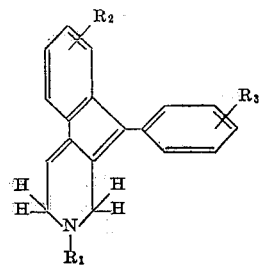

so as to produce the corresponding hydrogenated pyridindenes, $R_1$ being an alkyl group, and $R_2$ and $R_3$ being a member of the group consisting of hydrogen, alkyl and alkoxy radicals.

19. A process which comprises catalytically hydrogenating 2 - methyl - 9 - phenyl - dihydro-1-pyridindene which can be represented by the following formula and its salts:

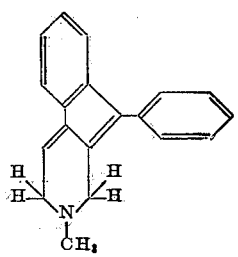

so as to produce the corresponding hydrogenated pyridindenes.

20. A process which comprises catalytically hydrogenating a 2-methyl-9-phenyl-dihydro-1- pyridindene hydrohalide the free base of which can be represented by the following formula:

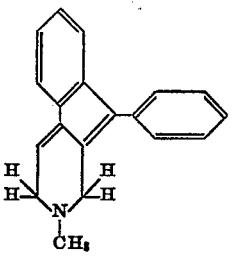

so as to produce the corresponding hydrogenated pyridindenes.

21. A process which comprises catalytically hydrogenating a 2-alkyl-9-phenyl-dihydro-1-pyridindene of the following formula and its salts:

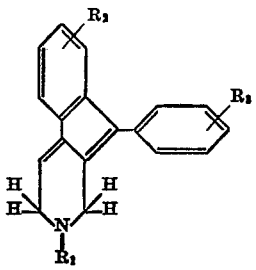

in the presence of Raney nickel so as to produce the corresponding 2-alkyl-9-phenyl-tetrahydro-1-pyridindene, $R_1$ being an alkyl group, and $R_2$ and $R_3$ being a member of the group consisting of hydrogen, alkyl and alkoxy radicals.

22. A process which comprises catalytically hydrogenating a 2-methyl-9-phenyl-dihydro-1-pyridindene hydrohalide which in the form of its free base can be represented by the following formula:

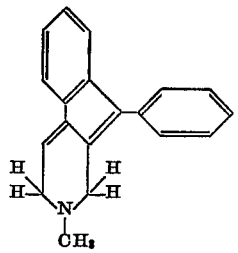

in the presence of Raney nickel so as to produce the corresponding 2-methyl-9-phenyl-tetrahydro-1-pyridindene.

JOHN T. PLATI.
WILHELM WENNER.

No references cited.

Certificate of Correction

Patent No. 2,470,109 — May 17, 1949.

JOHN T. PLATI ET AL.

It is hereby certified that errors appear in the printed specification of the above numbered patent requiring correction as follows:

Column 3, lines 69 to 72, for the left hand portion of the formula reading

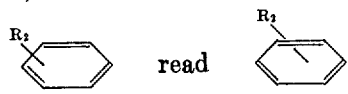 read same column, for the right hand portion of the same formula reading

 read column 4, line 29, for "componds" read *compounds*; column 10, line 34, after "pyridindene" strike out the word "less"; line 40, for "hydrobrobide" read *hydrobromide*; column 12, line 58, before "solution" insert *a*; line 67, after "pyridindene" insert *are*; column 13, line 55, for "crystallized" read *recrystallized*;

and that the said Letters Patent should be read with these corrections therein that the same may conform to the record of the case in the Patent Office.

Signed and sealed this 1st day of November, A. D. 1949.

[SEAL]

THOMAS F. MURPHY,
*Assistant Commissioner of Patents.*